United States Patent [19]

Bauman et al.

[11] 4,110,402

[45] Aug. 29, 1978

[54] RECOVERY OF STRONTIUM FROM BRINE THAT CONTAINS STRONTIUM AND CALCIUM

[75] Inventors: William C. Bauman; John M. Lee; John D. Watson, all of Lake Jackson, Tex.

[73] Assignee: The Dow Chemical Company, Midland, Mich.

[21] Appl. No.: 689,309

[22] Filed: May 24, 1976

[51] Int. Cl.$^2$ .............................................. C01F 11/46
[52] U.S. Cl. .................................... 423/166; 423/554
[58] Field of Search ....................... 423/166, 554, 193; 23/301 R

[56] References Cited

U.S. PATENT DOCUMENTS

| | | | |
|---|---|---|---|
| 2,044,954 | 6/1936 | Peirce | 423/554 |
| 2,045,301 | 6/1936 | Langer | 23/301 R |
| 3,029,133 | 4/1962 | Goodenough | 423/163 |
| 3,164,328 | 1/1965 | Van Dornick | 23/301 R |
| 3,547,597 | 12/1970 | Hays | 23/301 R |

FOREIGN PATENT DOCUMENTS 660,541  11/1951  United Kingdom .................. 23/301 R

*Primary Examiner*—O. R. Vertiz
*Assistant Examiner*—Wayne A. Langel
*Attorney, Agent, or Firm*—Daniel L. DeJoseph; Robert W. Selby

[57] ABSTRACT

Strontium values are recovered from a brine that contains strontium and calcium salts by admixing, with the brine, strontium sulfate seed and a water soluble sulfate and recovering the strontium sulfate that is thereby produced. The soluble sulfate should be more soluble in the brine than is $SrSO_4$.

9 Claims, No Drawings

RECOVERY OF STRONTIUM FROM BRINE THAT CONTAINS STRONTIUM AND CALCIUM

BACKGROUND OF THE INVENTION

This invention relates to the production of strontium compounds from brine that contains dissolved strontium salts and especially to the recovery of strontium as a sulfate from aqueous brine solutions which also contain a very high proportion of dissolved calcium salts. Strontium sulfate is a valuable product that is useful in the production of, among other things, pyrotechnics, ceramics, glass, and paper.

In the past it has been difficult to extract strontium values from brine that also contains certain alkaline earth salts, particularly calcium. Past methods that have attempted to solve this problem have been, to a great extent, unsatisfactory. For example, U.S. Pat. No. 1,831,251 teaches a method whereby strontium chloride is separated from brines that contain calcium chloride and magnesium chloride by cooling the brine to a temperature below 31° C., or just short of the saturation point of calcium chloride, while agitating. However, this method is disadvantageous in that a large amount of $CaCl_2$ precipitates along with $SrCl_2$, so that in the precipitate there is a 20 to 1 ratio of $CaCl_2$ to $SrCl_2$. Therefore, in order to separate the $CaCl_2$ from the $SrCl_2$ this method would require extensive purification of the precipitate and a high rate of calcium chloride recycle.

U.S. Pat. No. 3,029,133 teaches a method of obtaining $SrSO_4$ from an inland brine that contains strontium and calcium salts. In the process, the inland brine is evaporated until most of the NaCl in the brine crystallizes out of solution; the brine is then cooled to 70° C. whereupon some tachydrite (2 $MgCl_2 \cdot CaCl_2 \cdot 12\ H_2O$) crystallizes out. The brine is then further cooled to 28.5° C., at which temperature carnallite ($KCl \cdot MgCl_2 \cdot 6H_2O$) crystallizes out with a substantial portion of the $SrCl_2$. The carnallite crystals containing the $SrCl_2$ are then washed with water to produce a brine containing calcium and strontium values with a $Ca^{++}/Sr^{++}$ molar ratio of approximately 2.7/1. A soluble sulfate is then admixed with this brine and the solution is heated. The reaction mixture of brine and soluble sulfate is then filtered to separate the impure $SrSO_4$ thus formed which is then leached with a mineral acid. Thus, the method of U.S. Pat. No. 3,029,133 requires several treatments of the brine in order to reduce the molar ratio of $Ca^{++}/Sr^{++}$ to below 20/1 and preferably below 7/1.

The present invention can be employed to extract strontium from brine that contains a $Ca^{++}/Sr^{++}$ molar ratio greater than 20/1 and therefore the initial steps of the process of U.S. Pat. No. 3,029,133 can be eliminated. Thus, brines containing high ratios of calcium to strontium values can be directly treated to recover strontium compounds.

BRIEF DESCRIPTION OF THE INVENTION

Strontium sulfate recovered is from a brine that contains dissolved strontium values and a high proportion of dissolved calcium values by admixing the brine with strontium sulfate seed and a water soluble sulfate in an amount sufficient to precipitate the strontium and recovering the strontium that is thereby produced. This operation can be continuously repeated by adding the precipitate that is recovered from the preceding operation to new brine during the next run as seed.

DETAILED DESCRIPTION OF THE INVENTION

Any sulfate that is more soluble in water than is $SrSO_4$ is suitable for use in the invention. Examples of sulfates that can be used in the practice of this invention are calcium sulfate, sodium sulfate, magnesium sulfate, ammonium sulfate, and sulfuric acid.

The amount of sulfate added should be sufficient to remove the desired quantity of $Sr^{++}$ from the brine and can be determined stoichiometrically. The following equations illustrate the reaction thought to take place between the strontium salts in the brine and sodium and magnesium sulfate:

$$SrCl_2 + Na_2SO_4 \rightarrow SrSO_4 + 2NaCl \qquad (1)$$

$$SrCl_2 + MgSO_4 \rightarrow SrSO_4 + MgCl_2 \qquad (2)$$

Depending upon the purpose and needs of the individual practitioner of this invention, the amount of sulfate that is used can vary significantly, and in either direction, from the amount that is stoichiometrically determined to be sufficient to react with and precipitate all of the $Sr^{++}$ in the brine. A very small amount of sulfate (e.g., less than 10 percent of the amount that is stoichiometrically determined to be sufficient to react with the strontium), when admixed with the brine and the $SrSO_4$ seed, should precipitate a corresponding molar amount of $SrSO_4$. For practical purposes, however, the recommended percent of the sulfate to employ is between 55% and 75% of the amount that is stoichiometrically determined to be sufficient to react with the strontium.

The strontium sulfate seed is introduced into the reaction medium to promote the reaction of $Sr^{++}$ with $SO_4^{=}$ to form $SrSO_4$. The seed is introduced into the reaction medium in particle form, for instance by using the crystals of the mineral celestite. One method of introducing the seed is to heat the seed to reflux in a $Ca^{++}$ free brine and to mix this slurry with a brine which contains the $Sr^{++}$ and $Ca^{++}$ values.

The quantity of seed used has no effect on the yield of strontium precipitated from the brine. However, the quantity of seed affects the rate at which the $Sr^{++}$ is precipitated. The amount of seed to be used can vary from about 0.05 percent to about 50 percent, by weight, of the brine. Since the upper seed limit is 1,000 times greater than the lower limit, it can be seen that the individual practitioner will have a great deal of latitude in determining which amount of seed is best for his purposes.

At a pressure of 0 psig (pounds per square inch gauge) this invention can be practiced within a temperature range between the freezing point and the boiling point of the brine. As the pressure is increased the upper temperature limit likewise increases. For instance, at a pressure of 50 psig the reaction will take place at temperatures up to about 150° C. It is preferred to conduct the reaction at a temperature within a range of from about 60° C. to about 105° C. at 0 psig. Temperatures below 60° C. will not have any effect on the yield of the strontium precipitated but do require long reaction times. As the temperature increases so will the reaction rate, which can be further increased if the reaction components are put under pressure while the temperature is raised.

There is no specific order in which the soluble sulfate, $SrSO_4$ seed, and brine are to be mixed. Moreover, once the reaction components are mixed there are a variety of methods by which this invention can be practiced. For instance, Example 1 illustrates a continuous process whereby the precipitate from a preceding run is added to the next run as seed, to be thereby mixed with fresh brine and additional soluble sulfate. Other methods of practicing this invention can be seen in the Examples discussed below, such examples being, however, by no means conclusive as to the operational possibilities that exist.

The $SrSO_4$ precipitate can be recovered in any of a number of ways that are well-known in the art, such as by filtering techniques or settling chambers. Those skilled in the art can readily determine which method of recovery is best for their particular purposes.

EXAMPLES AND COMPARATIVE DATA

The examples which follow further illustrate the present invention and the manner in which it can be practiced; these examples should be construed merely as being representative and not as a limitation of the overall scope of the invention.

EXAMPLE 1

This example illustrates one distinct embodiment of the present invention. In this example, 500 ml brine which contains 0.26 percent (wt) $Sr^{++}$ and 3.3 percent (wt) $Ca^{++}$ was heated to a temperature of 95° C. 100 Grams celestite and 12.5 ml 15.5 percent (by weight) $Na_2SO_4$ (which was stoichiometrically determined to be 87 percent of the sulfate needed to precipitate all the $Sr^{++}$ in the brine) were then mixed with the brine. The brine was stirred for two minutes and then filtered. For the next run, the precipitate (102.45 gms) from the previous run was added to 500 ml of fresh brine as seed along with an additional 12.5 ml of 15.5 percent (by weight) $Na_2SO_4$. Aside from the precipitate, no additional seed was added. After 20 such runs, each run using the precipitate from the previous run as seed, the final precipitate was analyzed and found to contain a 14.6/1 $SrSO_4/CaSO_4$ ratio. The final brine sample was analyzed and found to contain 3.4 percent (wt) $Ca^{++}$ and 0.12 percent (wt) $Sr^{++}$. The original concentrations of $Ca^{++}$ and $Sr^{++}$ in the brine were, respectively, 3.3 percent (wt) and 0.26 percent (wt). It was calculated that 88 percent of the $Na_2SO_4$ sulfate reacted to precipitate $SrSO_4$.

EXAMPLE 2 AND COMPARATIVE RUN 1

This example and its comparative run illustrate the crucial role of the $SrSO_4$ seed in the practice of this invention. They show that even a small amount of the seed will produce a high yield of $SrSO_4$ precipitate.

In Example 2, 500 ml of $Sr^{++}$ and $Ca^{++}$ containing brine was heated to 90° C. while being stirred. 5 grams of $SrSO_4$ seed and 12.5 ml of 15.5 percent (by weight) $Na_2SO_4$ (75 percent of the sulfate stoichiometrically needed to precipitate all the $Sr^{++}$ in the brine) were then added to the brine. Filtered samples of the brine were taken at various intervals to determine its $Sr^{++}$ content, and the data from the analysis is listed in Table 1.

The components and reaction conditions of Comparative Run 1 are very similar to those of Example 2, with the exception that no seed was added in the run. After one hour, a filtered sample of the brine was taken. The liquid sample contained .36 percent (wt) $Sr^{++}$, which was the amount of $Sr^{++}$ in the original brine. The amount of $Ca^{++}$ in the original brine and the liquid sample was, respectively, 3.3 percent (wt) and 3.2 percent (wt). While $Ca^{++}$ reacted to form $CaSO_4$ there was, in effect, no substantial reaction of $Sr^{++}$ to form the $SrSO_4$ precipitate. There was approximately 1.8 gms precipitate which analyzed as $CaSO_4$ with a trace of $Sr^{++}$.

In summary, Example 2 illustrates that even a small amount of $SrSO_4$ seed will cause a significant degree of precipitation from a strontium-calcium loaded brine. Comparative Run 1 illustrates that, when the molar ratio of $Ca^{++}/Sr^{++}$ is 20/1, strontium will not precipitate from the brine in any appreciable amount if $SrSO_4$ seed is not present in the brine.

Table 1

| Sample No. | Elapsed Time from Start of Run (Min.) | Percent $Sr^{++}$ In Brine Sample |
| --- | --- | --- |
| 1 | 0 (Original Brine) | .36 |
| 2 | 15 | .30 |
| 3 | 30 | .20 |
| 4 | 60 | .14 |
| 5 | 120 | .11 |

EXAMPLE 3

In this run, 500 ml of a brine that contained 0.36 percent (wt) $Sr^{++}$ and 3.3 percent (wt) $Ca^{++}$ was heated to a temperature of 60° C while being stirred. 100 Grams of $SrSO_4$ seed and 12.5 ml of 15.5 percent (wt) $Na_2SO_4$ were then added to the brine. The brine was stirred and maintained at a temperature of 60° C throughout the run. Using a procedure similar to that shown in Example 2, filtered samples of the brine were taken periodically to determine the $Sr^{++}$ content in the brine. Table 2 lists the amount of $Sr^{++}$ as percent by weight of the brine taken at various time intervals.

Table 2

| Sample No. | Elapsed Time from Start of Run (Min) | Weight Percent $Sr^{++}$ in Brine Sample | Weight Percent $Na_2SO_4$ Reacting with $Sr^{++}$ to Precipitate $SrSO_4$ |
| --- | --- | --- | --- |
| 1 | 0 (Original Brine) | .36 | — |
| 2 | 5 | .19 | 63 |
| 3 | 10 | .14 | 81 |
| 4 | 20 | .10 | 96 |
| 5 | 60 | .10 | 96 |

EXAMPLE 4

In this example $CaSO_4.2H_2O$, rather than $Na_2SO_4$, was used to precipitate $SrSO_4$ from the brine.

500 ml of a brine that contained 0.36 percent (wt) $Sr^{++}$ and 3.3 percent (wt) $Ca^{++}$ was heated to a temperature of 95° C. 100 Grams celestite and 3.3 grams $CaSO_4.2H_2O$ (which was 75 percent of the stoichiometric amount of sulfate needed to precipitate all the $Sr^{++}$ in the brine) were then mixed with the brine. The brine was stirred for 10 minutes and then filtered.

After 20 such runs of 10 minutes each using procedures similar to those shown in Example 1 (i.e. the precipitate from the preceding run was added, as the only seed, to fresh brine and additional sulfate) the final precipitate was analyzed and was found to contain 88.5 percent $SrSO_4$ and 6.5 percent $CaSO_4$. The final brine sample analyzed contained 3.51 percent $Ca^{++}$ plus 0.09 percent $Sr^{++}$. Approximately 100 percent of the $CaSO_4.2H_2O$ sulfate reacted with $Sr^{++}$ to precipitate $SrSO_4$.

EXAMPLES 5-7

These examples illustrate how the precipitate-forming reaction rate varies at different temperatures.

In Example 5, a mixture of 500 ml brine, 100 gm celestite, and 12.5 ml 15.5 percent (weight) $Na_2SO_4$ was stirred at room temperature (25° C). Filtered samples of the brine were taken at time intervals to determine the reaction rate. Examples 6 and 7 are similar to Example 5, with the exception that the reaction temperatures employed were, respectively, 60° C and 90° C.

Table 3 lists the weight percent of $Sr^{++}$ that was found to be removed at various time intervals for each reaction temperature. Table 3 also lists the percentage of $Na_2SO_4$ sulfate that reacted with $Sr^{++}$, at the various time intervals for each reaction temperature, to precipitate $SrSO_4$ from the brine.

Table 3

| Elapsed Time from Start of Run (Min) | Wt. Percent of $Sr^{++}$ Removed from Brine | | | Weight Percent $Na_2SO_4$ Reacting with $Sr^{++}$ to Precipitate $SrSO_4$ | | |
|---|---|---|---|---|---|---|
| | 25° C | 60° C | 90° C | 25° C | 60° C | 90° C |
| 5 | * | 47.2 | 67.7 | — | 63 | 90 |
| 10 | * | 61.1 | ** | — | 81 | — |
| 20 | 10.3 | 72.2 | ** | 14 | 96 | — |
| 60 | 12.3 | 72.2 | ** | 16 | 96 | — |
| 240 | 28.0 | ** | ** | 37 | — | — |
| 360 | 34.2 | ** | ** | 46 | — | — |

* less than 10 percent
** no brine sample taken

EXAMPLES 8-11

These examples illustrate the effect that the quantity of seed added to the brine has on the rate of the precipitate-forming reaction. In Example 8, 500 ml of $Ca^{++}$ containing brine that contained 0.235 percent $Sr^{++}$ was mixed with 5 gm of $SrSO_4$ seed. This mixture was heated to 90° C and a 15 percent by weight solution of $Na_2SO_4$ was added in an amount calculated as sufficient to precipitate 75 percent of the $Sr^{++}$ in the brine. Filtered samples of the brine were taken at various time intervals. Table 4 lists, at such various time intervals, the percent by weight of $Sr^{++}$ that was removed from the brine and the percent by weight $Na_2SO_4$ sulfate that reacted with $Sr^{++}$ to precipitate $SrSO_4$ from the brine.

The procedure of Example 8 was repeated for Examples 9-11. In those examples, however, the amount of $SrSO_4$ seed added to the brine varied from 10 gm (Example 9), to 25 gm (Example 10) to 100 gm (Example 11). Table 4 lists information for Examples 9-11 similar to the information listed for Example 8.

Examples 8-11 illustrate that the quantity of seed added to the brine has a significant effect on the rate of reaction but does not significantly affect the yield of $SrSO_4$ precipitate formed. Table 4 illustrates that if the amount of seed added to the brine is decreased the reaction time must be increased if one is to achieve yields comparable to those obtained when large amounts of seed are used.

Table 4

| Elapsed Time From Start of Run | Weight Percent of $Sr^{++}$ Removed from Brine | | | | Weight Percent $Na_2SO_4$ Reacting with $Sr^{++}$ to Precipitate $Sr_4SO_4$ | | | |
|---|---|---|---|---|---|---|---|---|
| | 5 gm Seed | 10 gm Seed | 25 gm Seed | 100 gm Seed | 5 gm Seed | 10 gm Seed | 25 gm Seed | 100 gm Seed |
| 5 | * | 19.1 | 34.9 | 66.7 | — | 25 | 47 | 89 |
| 15 | 16.7 | 42.6 | 66.8 | ** | 22 | 57 | 89 | — |
| 30 | 44.4 | 66.0 | 67.2 | ** | 59 | 88 | 90 | — |
| 60 | 61.1 | ** | ** | ** | 81 | — | — | — |
| 120 | 69.4 | ** | ** | ** | 93 | — | — | — |

* less than 10 percent
** no brine sample taken

EXAMPLE 12

This example illustrates that, as the $Ca^{++}$ to $Sr^{++}$ molar ratio on the brine increases beyond a certain level, increasingly lesser amounts of the soluble sulfate (in this example $Na_2SO_4$) reacts with $Sr^{++}$ to precipitate $SrSO_4$ and a correspondingly greater amount of the sulfate reacts with $Ca^{++}$ to precipitate $CaSO_4$.

In this example, 500 ml of a brine that contained 0.26 percent (wt) $Sr^{++}$ and 3.3 percent (wt) $Ca^{++}$ was mixed in a reaction vessel and was then heated to 90° C, which temperature was maintained throughout the run. Small increments of $Na_2SO_4$ were periodically added to the brine. Approximately 15 minutes after each increment of $Na_2SO_4$ was added, a filtered sample of the brine was taken. This procedure was repeated until the total amount of $Na_2SO_4$ added was 115 percent of the amount calculated to be needed to precipitate all the $SrSO_4$ in the brine. As the $Sr^{++}$ is gradually removed from the brine by the succeeding additions of $Na_2SO_4$, the $Ca^{++}/Sr^{++}$ ratio in the brine increases. Table 5 illustrates that as the $Ca^{++}/Sr^{++}$ ratio increases above a certain level the percentage of $Na_2SO_4$, in total and from each succeeding increment, that reacts with $Sr^{++}$ to precipitate $SrSO_4$ decreases. For example, when the $Ca^{++}/Sr^{++}$ mol ratio was approximately 49, 89.6 percent by weight of the next $Na_2SO_4$ increment reacted with salt to precipitate $SrSO_4$. However, when the ratio is increased to 73, only 31 percent by weight of the next $Na_2SO_4$ increment reacted with salt to precipitate the strontium product. Additional data is provided in Table 5.

It has been thereby determined that this invention can be practiced when the mol ratio of $Ca^{++}/Sr^{++}$ is as high as about 99/1, although the upper preferred mol ratio of $Ca^{++}/Sr^{++}$ is about 68/1.

Table 5

| Sample | Percent by Weight of the $Na_2SO_4$ Calculated as Needed to Precipitate All the $Sr^{++}$ in the Brine | Weight Percent $Sr^{++}$ Removed | $Ca^{++}/Sr^{++}$ Mol Ratio | Weight Percent of Total $Na_2SO_4$ Reacting with $Sr^{++}$ or $Ca^{++}$ to Form Precipitate | | Weight Percent of Each Increment of $Na_2SO_4$ Reacting with $Sr^{++}$ or $Ca^{++}$ to Form Precipitate | |
|---|---|---|---|---|---|---|---|
| | | | | $Sr^{++}$ | $Ca^{++}$ | $Sr^{++}$ | $Ca^{++}$ |
| 1 | 0 | 0 | 27.7 | 0 | 0 | — | — |
| 2 | 38.5 | 38.33 | 48.82 | 99.8 | 0.2 | 99.8 | 0.2 |
| 3 | 61.3 | 58.75 | 73.01 | 97.0 | 3.0 | 89.6 | 10.4 |
| 4 | 84.7 | 65.83 | 87.23 | 81.0 | 19.0 | 30.7 | 69.3 |
| 5 | 100.1 | 68.33 | 94.02 | 68.0 | 32.0 | 16.3 | 83.7 |
| 6 | 1115.5 | 70.00 | 99.39 | 55.0 | 45.0 | 10.8 | 89.2 |

What is claimed is:

1. A method of recovering strontium as a sulfate from a brine that contains strontium and calcium in a $Ca^{++}/Sr^{++}$ molar ratio of greater than 20/1 which comprises mixing, with the brine, strontium sulfate seed and a sulfate that is more soluble in water than is strontium sulfate and recovering the strontium sulfate that is thereby produced.

2. The method of claim 1 wherein the brine has a $Ca^{++}/Sr^{++}$ molar ratio of from 49/1 to 73/1.

3. The method of claim 2 wherein a precipitate including a major weight percentage of $Sr^{++}$ and a minor weight percentage of $Ca^{++}$ is formed.

4. The method of claim 1 wherein the mixing step takes place at a temperature between about 60° and about 105° C.

5. The method of claim 1 wherein the sulfate is selected from the group consisting of calcium sulfate, sodium sulfate, magnesium sulfate, ammonium sulfate, and sulfuric acid.

6. The method of claim 1 wherein the brine has a $Ca^{++}/Sr^{++}$ molar ratio that is no greater than about 99/1.

7. The method of claim 1 wherein the brine has a $Ca^{++}/Sr^{++}$ molar ratio that is no greater than about 68/1.

8. The method of claim 1 wherein the amount of strontium sulfate seed used is from about 0.05 weight percent to about 50 weight percent of the brine.

9. The method of claim 1 wherein a precipitate including a major weight percentage of $Sr^{++}$ and a minor weight percentage of $Ca^{++}$ is formed.

* * * * *

UNITED STATES PATENT AND TRADEMARK OFFICE
CERTIFICATE OF CORRECTION

PATENT NO. : 4,110,402
DATED : August 29, 1978
INVENTOR(S) : W. C. Bauman et al.

It is certified that error appears in the above—identified patent and that said Letters Patent are hereby corrected as shown below:

In Table 5, Sample 6, column 2, delete "1115.5" and insert --115.5--.

Signed and Sealed this

Twenty-fourth Day of April 1979

[SEAL]

Attest:

RUTH C. MASON
Attesting Officer

DONALD W. BANNER
Commissioner of Patents and Trademarks